United States Patent
Kreese et al.

(10) Patent No.: US 9,586,571 B2
(45) Date of Patent: Mar. 7, 2017

(54) METHOD OF OPTIMIZING VEHICLE PERFORMANCE BASED ON COUNTERSHAFT ACCELERATION

(71) Applicant: Allison Transmission, Inc., Indianapolis, IN (US)

(72) Inventors: John P. Kreese, Martinsville, IN (US); Avery T Sheets, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 77 days.

(21) Appl. No.: 14/797,701

(22) Filed: Jul. 13, 2015

(65) Prior Publication Data

US 2015/0314786 A1 Nov. 5, 2015

Related U.S. Application Data

(63) Continuation of application No. 13/606,072, filed on Sep. 7, 2012, now Pat. No. 9,162,663.

(60) Provisional application No. 61/532,707, filed on Sep. 9, 2011.

(51) Int. Cl.

| | |
|---|---|
| *B60W 10/06* | (2006.01) |
| *B60W 10/11* | (2012.01) |
| *F16H 63/50* | (2006.01) |
| *B60W 10/04* | (2006.01) |
| *B60W 30/188* | (2012.01) |
| *F16H 59/38* | (2006.01) |
| *F16H 37/04* | (2006.01) |

(52) U.S. Cl.
CPC ............ *B60W 10/06* (2013.01); *B60W 10/04* (2013.01); *B60W 30/188* (2013.01); *F16H 37/046* (2013.01); *F16H 59/38* (2013.01); *F16H 63/50* (2013.01); *B60W 2510/104* (2013.01); *B60W 2510/1045* (2013.01); *B60W 2710/0666* (2013.01); *F16H 2063/508* (2013.01)

(58) Field of Classification Search
None
See application file for complete search history.

(56) References Cited

U.S. PATENT DOCUMENTS

| | | | |
|---|---|---|---|
| 4,023,443 A | 5/1977 | Usui et al. | |
| 6,021,370 A | 2/2000 | Bellinger et al. | |
| 6,843,755 B2 * | 1/2005 | Estebanez | B60W 10/06 477/107 |
| 2002/0144562 A1 | 10/2002 | Forsyth | |
| 2003/0183032 A1 | 10/2003 | Shimaguchi | |
| 2003/0186780 A1 | 10/2003 | Estebanez et al. | |
| 2005/0256631 A1 * | 11/2005 | Cawthorne | B60K 6/40 701/99 |
| 2007/0234834 A1 | 10/2007 | Gitt et al. | |

(Continued)

*Primary Examiner* — Edwin A Young
(74) *Attorney, Agent, or Firm* — Taft Stettinius & Hollister LLP; Stephen F. Rost (57) ABSTRACT

The present invention provides a method of controlling input torque of a powered vehicle. The vehicle includes a transmission having an input shaft, an output shaft, and a countershaft. The method includes providing input torque to the input shaft, determining a rotational acceleration of the countershaft, and measuring vehicle speed. The method also includes determining a threshold based on the measured vehicle speed. The measured countershaft acceleration is compared to the threshold and the input torque is controlled based on the result of the comparison.

17 Claims, 4 Drawing Sheets

(56) References Cited

U.S. PATENT DOCUMENTS

2008/0045380 A1    2/2008   Ebner et al.
2008/0071427 A1    3/2008   Szepek et al.
2008/0125267 A1    5/2008   Dourra et al.
2008/0182713 A1    7/2008   Asaoka
2010/0114443 A1    5/2010   Terwart et al.
2012/0123654 A1    5/2012   Byerly et al.
2014/0324309 A1   10/2014   Karpenman et al.

\* cited by examiner

METHOD OF OPTIMIZING VEHICLE PERFORMANCE BASED ON COUNTERSHAFT ACCELERATION

RELATED APPLICATIONS

This application is a continuation application of U.S. patent application Ser. No. 13/606,072, filed Sep. 7, 2012, which claims priority to U.S. Provisional Patent Application Ser. No. 61/532,707, filed Sep. 9, 2011, which are hereby incorporated by reference in their entirety.

FIELD OF THE DISCLOSURE

The present invention relates to a method of optimizing vehicle performance, and in particular to a method of optimizing vehicle performance using countershaft acceleration.

BACKGROUND

Engine and transmission manufacturers continue to seek ways to improve fuel economy and vehicle performance in powered vehicle systems. Conventional vehicle transmissions include software or a control scheme for determining when the automatic transmission shifts from one gear range (or ratio) to another gear range. This control scheme is commonly referred to as a "shift schedule" and is based on multiple factors, e.g., engine torque, vehicle speed, accelerator pedal position (i.e., throttle percentage), transmission output speed, and tractive effort. Any given shift schedule for a vehicle balances fuel economy against performance.

In addition, engine and transmission manufacturers work together to form an integrated system that drives vehicle performance. For instance, an engine may produce different torque levels to drive a transmission based on a specific driving condition. At a lower torque level, the vehicle may operate with better fuel efficiency but with reduced performance. At a higher torque level, the vehicle may perform better but consumes more fuel.

Many conventional vehicle setups control engine torque by monitoring a vehicle's acceleration. The reason for doing so is because there is no easy or convenient way to limit torque based on transmission performance. Most conventional transmission assemblies include a single centerline on which input and output shafts are disposed. The input and output shafts rotate at high speeds and accelerate/decelerate quickly such that it is difficult to control engine performance based on these speeds. Thus, engine torque is controlled by vehicle performance rather than transmission performance. However, integrating the engine and transmission such that engine performance is controlled based on transmission performance is desirable since the two assemblies are integrated with one another for different vehicle setups.

Therefore, a need exists for optimizing vehicle performance by controlling engine torque based on a transmission characteristic.

SUMMARY

In an exemplary embodiment of the present invention, a method is provided for controlling input torque of a powered vehicle. The vehicle includes a transmission having an input shaft, an output shaft, and a countershaft. The method includes providing input torque to the input shaft, determining a rotational acceleration of the countershaft, and measuring vehicle speed. The method also includes determining a threshold based on the measured vehicle speed. The measured countershaft acceleration is compared to the threshold and the input torque is controlled based on the result of the comparison.

In one form of this embodiment, the method further includes continuously measuring countershaft speed with a speed sensor and calculating countershaft acceleration over a given time period. In another form thereof, the controlling step comprises limiting the input torque. The method can also include maintaining the amount of input torque provided to the input shaft. In addition, the method can include sending a signal to an engine controller to control the input torque. Alternatively, the method can include repeating the comparing step until the countershaft acceleration is less than the threshold. In one aspect of this embodiment, the threshold is determined from an acceleration curve based on vehicle speed and vehicle acceleration. In another aspect, the method includes interpolating between at least two vehicle acceleration data points and determining the threshold based on the result of the interpolating step. Moreover, a signal can be sent to an engine control circuit to increase the amount of input torque provided to the input shaft until the countershaft acceleration is within a percentage of the threshold.

In a different embodiment, a method is provided for controlling input torque to a transmission of a powered vehicle. The transmission is operably powered by an engine. The method includes (a) transferring torque to an input of the transmission; (b) measuring a rotational speed of a countershaft in the transmission; (c) computing an acceleration of the countershaft based on the measured rotational speed; (d) determining a vehicle acceleration threshold based on vehicle speed; (e) comparing countershaft acceleration to the threshold; and (f) controlling input torque based on the result of the comparison.

In this embodiment, the method can include limiting the input torque, or furthermore, reducing the input torque until the countershaft acceleration is less than the threshold. Similarly, the method can also include sending a signal to an engine controller to control the input torque. Each of the steps in the method can be continuously repeated until the countershaft acceleration is less than the threshold.

In another embodiment, a transmission system for a powered vehicle is provided. The system includes a fluid-coupling device configured to receive input torque from an engine drive shaft; an input shaft disposed along a first axis and operably coupled to the fluid-coupling device; an output shaft disposed along the first axis and configured to transfer torque to a rear axle of the vehicle; a countershaft disposed along a second axis, where the first axis and second axis are parallel but spaced from one another; a first sensor, a second sensor, and a third sensor, where the first sensor is configured to measure rotational speed of the input shaft, the second sensor is configured to measure rotational speed of the output shaft, and the third sensor is configured to measure rotational speed of the countershaft; and a controller disposed in electrical communication with the first sensor, second sensor and third sensor. The controller is configured to determine countershaft acceleration and compare the calculated acceleration to a threshold value. Based on the comparison, the controller is configured to request an adjustment in the amount of input torque being received by the fluid-coupling device.

In one aspect of this embodiment, a second countershaft is disposed along a third axis, where the first axis, second axis, and third axis are each spaced from and parallel to one another. Moreover, a fourth sensor is in electrical communication with the controller, where the fourth sensor is configured to measure rotational speed of the second countershaft. In a different aspect, the system further includes a set of instructions readable by the controller, where the instructions include a plurality of data points of acceleration. The controller is configured to determine the threshold value from the plurality of data points.

An advantage of the present disclosure is the ability to reduce or limit torque to a defined level, or threshold, for purposes of improving fuel economy. During operation, the transmission controller can monitor countershaft acceleration and when the acceleration exceeds a defined level, the input torque to the transmission can be controlled for fuel savings. This can be achieved without a vehicle operator or passenger feeling the difference in torque level. In other words, the transmission controller can communicate with the engine controller to limit input torque without notifying or communicating the same to the vehicle operator.

Another advantage is the integral control of input torque via the engine and transmission. In many conventional vehicle setups, engine power can be controlled by monitoring vehicle performance. In the present disclosure, however, vehicle performance can be better optimized through the integrated communication between the engine and transmission.

A further advantage is the use of countershaft acceleration can provide reliable and consistent values for monitoring vehicle performance. In at least one aspect of the present disclosure, the countershaft is arranged such that its rotational acceleration can be monitored reliably compared to other components in the transmission. This allows for better vehicle performance and improved fuel efficiency over many conventional setups.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
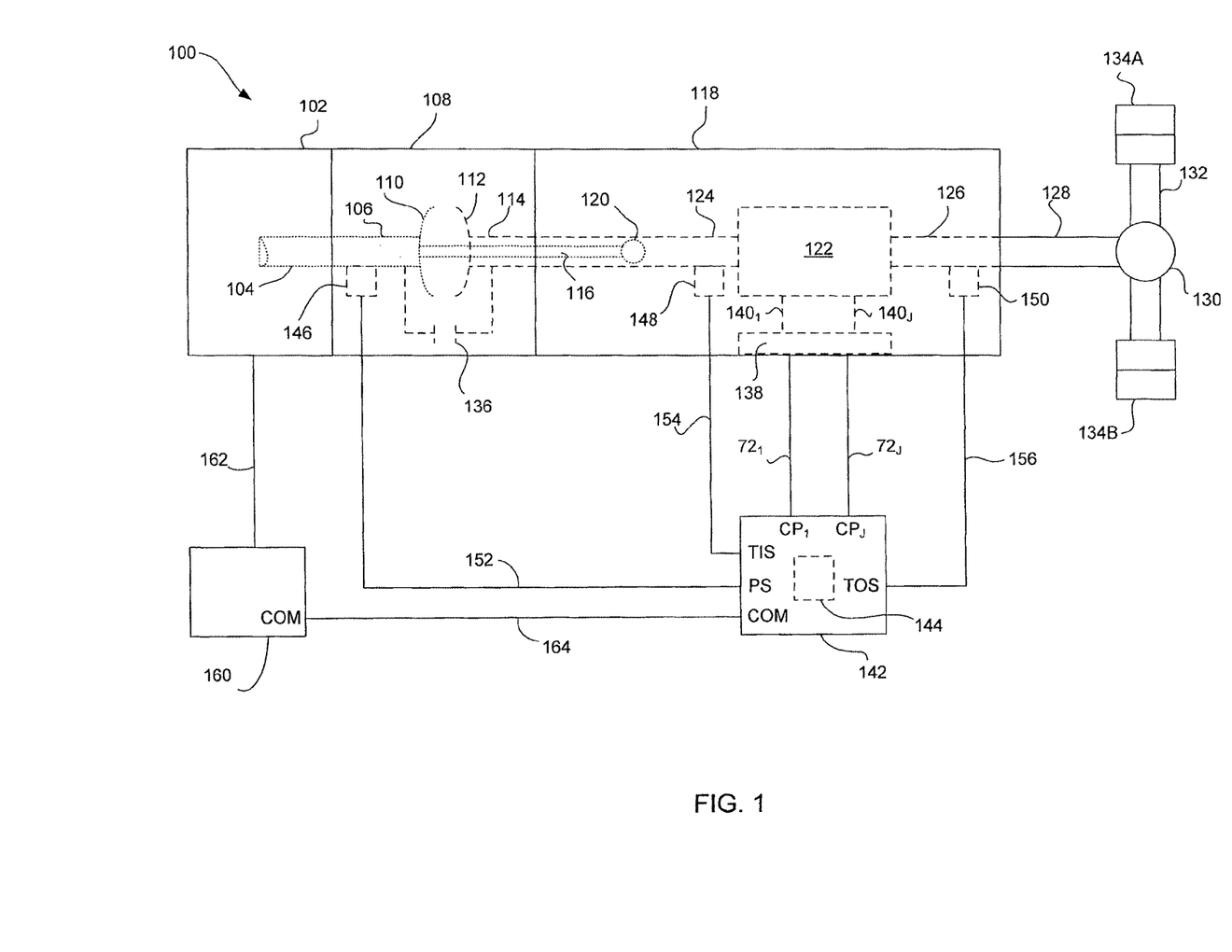
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths 140$_1$-140$_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths 72$_1$-72$_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths 72$_1$-72$_J$ to control the friction applied by each of the plurality of friction devices by controlling the pressure of fluid within one or more corresponding fluid passageway 140$_1$-140$_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
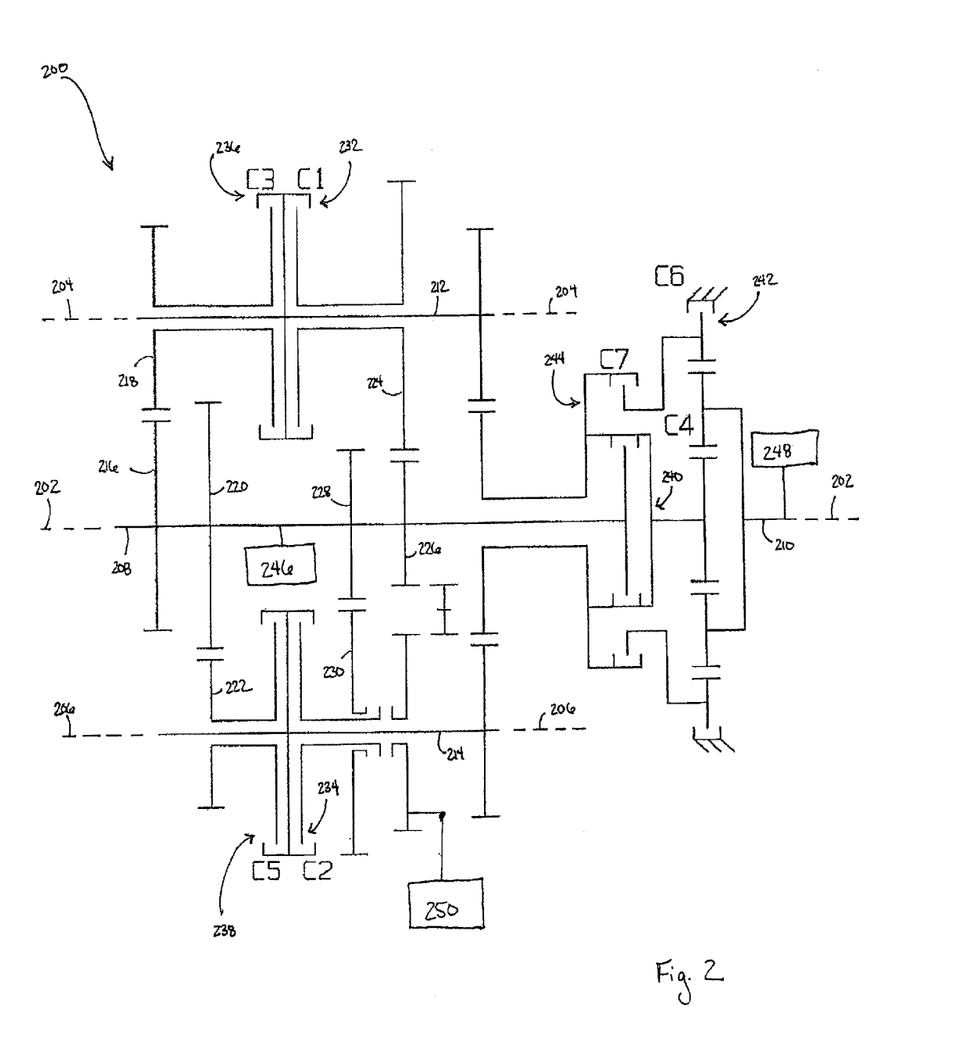
FIG. 2 is a schematic view of a gear configuration of an automatic transmission having a countershaft.

Referring to FIG. 2, an embodiment of an exemplary transmission 200 is shown. The transmission 200 can be arranged to include a plurality of centerlines defined between an input and output thereof. For instance, a first centerline 202 is defined such that an input shaft 208 and output shaft 210 are disposed thereon. The input shaft 208 can be operably coupled to a fluid coupling device such as a torque converter (not shown). The transmission 200 can further include a second centerline 204 and a third centerline 206. A first countershaft 212 can be arranged along the second centerline 204 and a second countershaft 214 can be arranged along the third centerline 206.

In this embodiment, the input shaft 208 and first countershaft 212 can be coupled to one another by a pair of torque-transmitting devices 216, 218 (e.g., meshing gears). Similarly, the input shaft 208 and second countershaft 214 can be coupled to one another by a different pair of torque-transmitting devices 220, 222 (e.g., meshing gears). As an alternative, sprocket assemblies can be used instead of meshing gears for coupling the input shaft 208 to the first countershaft 212 and second countershaft 214. A third pair of torque-transmitting devices 224, 226 (e.g., meshing gears) and a fourth pair of torque-transmitting devices 228, 230 (e.g., meshing gears) can further couple the input shaft 208 to the first countershaft 212 and second countershaft 214, respectively, depending on which clutch assemblies are applied.

In FIG. 2, the transmission 200 can include a plurality of clutch assemblies (e.g., wet clutches, dry clutches, dog clutches, brake discs, etc.). In this disclosed embodiment, the transmission 200 includes a first clutch assembly 232, a second clutch assembly 234, a third clutch assembly 236, a fourth clutch assembly 238, a fifth clutch assembly 240, a sixth clutch assembly 242, and a seventh clutch assembly 244. In other embodiments, there can be additional or fewer clutch assemblies. In the present disclosure, there can be any number and type of clutch assemblies.

During transmission operation, the rotational speed of the input shaft 208, output shaft 210, and countershafts 212, 214 can be measured. In one embodiment, the first countershaft 212 and second countershaft 214 can rotate at about the same speed. In another embodiment, the countershafts can rotate at different speeds. In a further embodiment, the first countershaft 212 and second countershaft 214 can rotate at about the same speed or at different speeds depending on the gear ratio. To measure input shaft speed, a sensor 246 is provided. Likewise, output shaft speed can be measured by another sensor 248 located proximate the output shaft 210. The sensors 246, 248 can be similar to any one of the speed sensors 146, 148, and 150 in FIG. 1. The sensors 246, 248 can be coupled to an outer housing of the transmission 200 or disposed internally of the outer housing. The countershaft speeds can be measured by a third sensor 250 which is positioned near the second clutch assembly 234.

Each of the sensors 246, 248, 250 can be electrically coupled to a transmission control circuit similar to the one in FIG. 1 (e.g., circuit 142). Thus, the control circuit can communicate with the sensors and perform functions based on such communication. Further, the control circuit can be electrically coupled to an engine control circuit (e.g., drive unit control circuit 160) for communicating back and forth.

In this disclosure, the transmission control circuit can receive signals from the sensors 246, 248, 250 and perform an action including communicating with the engine control circuit to control engine and transmission performance.

Figure 3:
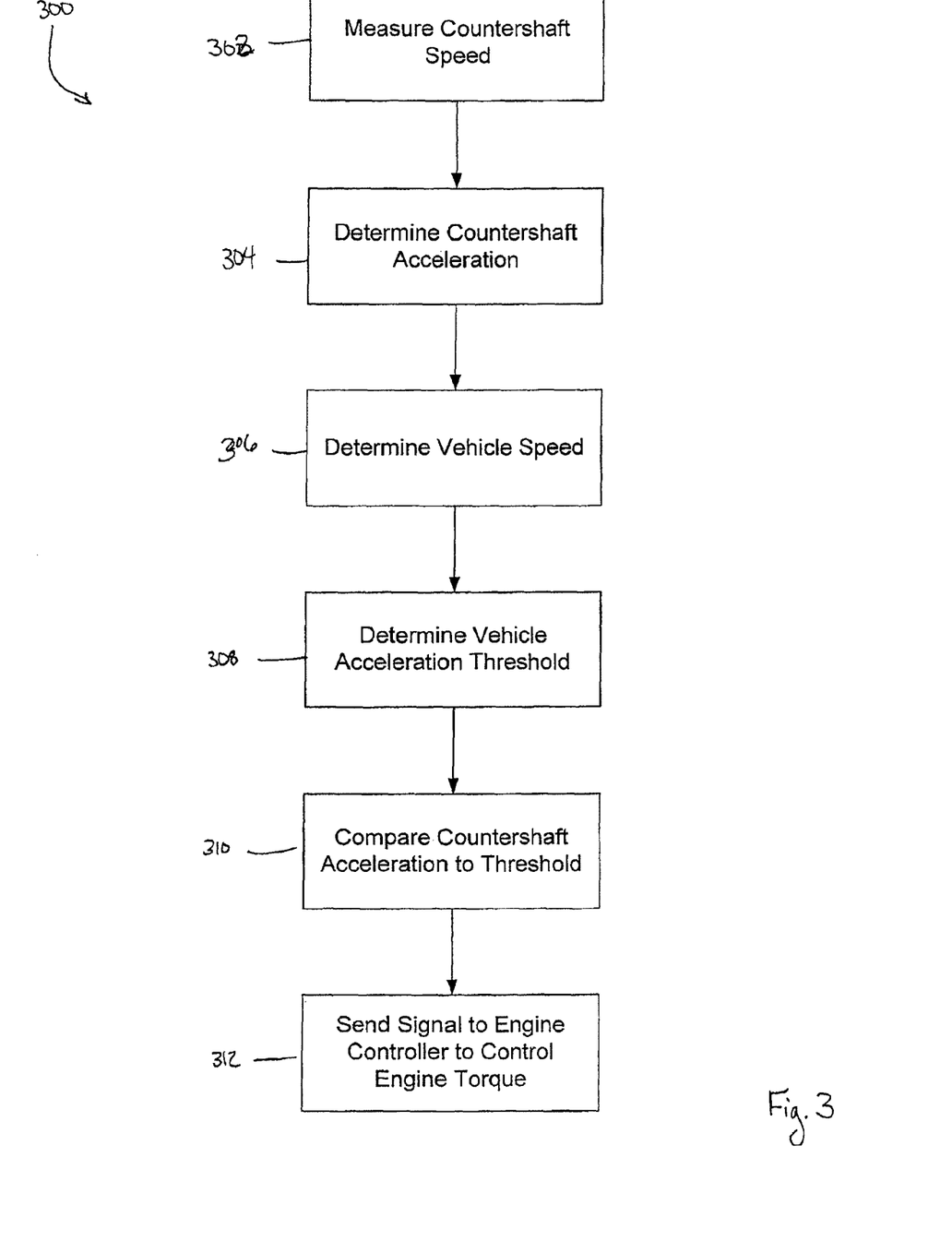
FIG. 3 is a flowchart of an embodiment for controlling engine torque based on a transmission characteristic.

In FIG. 3, an exemplary method 300 of controlling input torque to a transmission is provided. In block 302, the rotational speed of the countershaft is measured by a speed sensor. Referring to FIG. 2, for example, the sensor 250 is positioned to measure the rotational speed of the first countershaft 212 and second countershaft 214. Once the countershaft speed is measured, the sensor 250 can send a signal to the transmission controller 104 with the measured speed. The sensor 250 can continuously measure the countershaft speed and repeatedly send signals to the transmission controller with the measurements. Moreover, as is the case in FIG. 2 with two or more countershafts, there may be a plurality of countershaft speed sensors 250 disposed in or on the transmission to measure the rotational speed of each countershaft. Each speed sensor 250 can be in electrical communication with the transmission control circuit such that each countershaft speed is received by the transmission control circuit in block 302.

In block 304, the transmission controller 104 can calculate countershaft acceleration based on the repeated countershaft speed measurements sent by the sensor 250. Countershaft acceleration can be computed according to any known, conventional manner. For instance, over a time period of collecting countershaft rotational speed measurements, the acceleration can be computed according to known means. Similar to countershaft speed measurements, the transmission control circuit 104 can repeatedly calculate countershaft acceleration.

As the transmission control circuit continuously computes the countershaft acceleration, a signal containing current vehicle speed data can be provided to the transmission control unit in block 306. Vehicle speed can be provided over a datalink or databus as described above. Alternatively, it can be measured by a vehicle speed sensor mounted to the vehicle.

In block 308, once the vehicle speed is known, the transmission control circuit can determine a threshold value based on vehicle speed. In one embodiment, a software program downloaded to and readable by the transmission control circuit includes threshold values. The threshold values can be arranged in one or more tables, graphically, or in another format. The threshold can be determined based on the vehicle speed and calculated countershaft acceleration. A non-limiting example of this is provided in FIG. 4.

Figure 4:
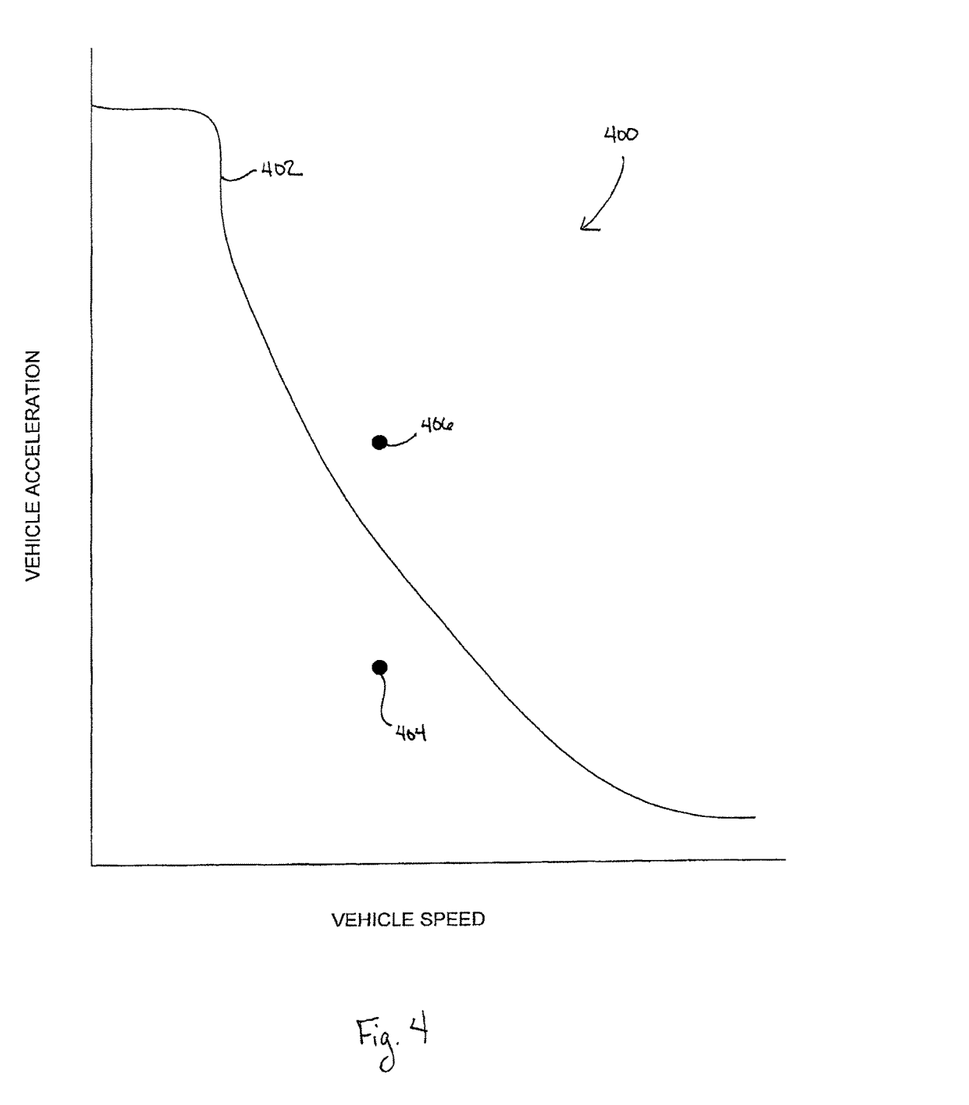
FIG. 4 is an exemplary graph of a vehicle acceleration curve plotted against vehicle speed.

In FIG. 4, a graphical representation 400 is provided to illustrate the manner in which the threshold value is obtained in block 308. In this representation 400, vehicle acceleration is plotted against vehicle speed and a curve 402 is shown. The curve 402 can represent a preferred or desired acceleration curve for purposes of fuel economy and/or vehicle performance. The curve 402 can have any desired shape depending on its use. Moreover, there can be two or more such curves depending on various conditions (e.g., vehicle performance, road conditions, vehicle load, etc.).

In a different embodiment, the vehicle speed and vehicle acceleration data can be arranged in a tabular format rather than a graphical format. The transmission control circuit can interpolate between values in one or more of the tables for determining the threshold value. The threshold value can be defined as an acceleration value.

In block 310, the countershaft acceleration that is calculated in block 304 can be compared to the threshold value obtained in block 308. To do so, the countershaft acceleration value is compared to the vehicle acceleration values, for example, in the graphical representation 400 of FIG. 4. The transmission control circuit uses the vehicle speed and countershaft acceleration to determine how the calculated countershaft acceleration compares to the curve 402. In a first, non-limiting example, the countershaft acceleration may be calculated as a first data point 404. In this example, the countershaft acceleration is below the curve 402. As such, the transmission control circuit can request additional input torque from the engine or drive unit without substantially affecting fuel efficiency. In other words, the amount of input torque being transferred to the transmission has not exceeded a threshold limit which would cause the countershaft to accelerate at a rate that is detrimental to fuel economy. The transmission control unit can either request additional input torque, or the transmission control unit can remain idle and allow the engine or drive unit to continue producing the same amount of torque.

In an alternative example, the countershaft acceleration may be calculated at a second data point 406. In this instance, the countershaft acceleration actually exceeds a desirable limit (e.g., is shown above the curve 402 in FIG. 4). The transmission control unit can determine this and take appropriate action, including but not limited to sending a signal to an engine control unit to limit or reduce input torque (block 312). In one aspect, it may be desirable to reduce input torque until the countershaft acceleration is less than the threshold. In a different aspect, it may be desirable to reduce input torque to a percentage (e.g., 90%) of the desired or maximum acceleration.

If the transmission control circuit has data points in the form of tabular data, the control circuit can calculate countershaft acceleration and compare the calculated result to the data points in the one or more tables. In the event the calculated countershaft acceleration falls between two threshold data points, the controller 104 can interpolate in block 308 to determine the threshold value. As previously described, the controller 104 can perform the functions of blocks 310 and 312 once the threshold value is determined.

In the embodiment of FIG. 2, the countershaft speed can be a ratio of the input shaft speed. In an embodiment in which the sensor 250 is not provided or malfunctions, the controller can calculate countershaft speed. For instance, the countershaft speed can be calculated as the product of an output splitter gear ratio and measured output shaft speed. Alternatively, the countershaft speed can be computed as the product of the output splitter gear ratio, the current transmission gear ratio, and the input shaft speed.

In one non-limiting embodiment, the transmission 200 can shift between at least ten different forward ranges and two reverse ranges. In at least two different forward ranges, the sixth clutch assembly 242 is applied in one of the ranges and the seventh clutch assembly 244 is applied in the other. The sixth and seventh clutch assemblies can form an output assembly range clutch pack. When the transmission shifts between the aforementioned forward ranges, e.g., when one of the sixth and seventh clutch assemblies is unapplied and the other is applied, the resulting countershaft speed is proportional to the gear ratio of the output assembly range clutch pack.

In many instances, countershaft acceleration is an easier calculation and transmission characteristic to use for controlling vehicle and transmission performance. In particular, countershaft acceleration can be substantially easier to control compared to input shaft acceleration, and thus it is one advantage of the present disclosure. The input shaft acceleration, and in particular input shaft speed, can often change rapidly through each transmission gear shift during operation. Alternatively, in many embodiments, the countershaft speed does not change rapidly other than during a single shift (e.g., between a shift from a fifth range to a sixth range). In one exemplary embodiment, the transmission 200 can shift between eight or more ranges, and at least during vehicle launch, the shifts occur frequently between a first range and a higher range that acceleration control needs to operate in an open-loop mode if using input shaft speed as feedback. This can often be difficult to control, particularly when it is desired to maintain or achieve desired fuel economy and vehicle performance.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling input torque of a powered vehicle, the vehicle including a transmission having an input shaft, an output shaft, and a countershaft, comprising:
   providing input torque to the input shaft;
   determining a rotational acceleration of the countershaft;
   measuring vehicle speed;
   determining a threshold based on the measured vehicle speed;
   comparing the countershaft acceleration to the threshold; and
   controlling the input torque based on the result of the comparison.

2. The method of claim 1, further comprising:
   continuously measuring countershaft speed with a speed sensor over a time period; and
   calculating countershaft acceleration over the time period.

3. The method of claim 1, wherein the controlling comprises limiting the input torque.

4. The method of claim 1, wherein the controlling comprises maintaining the amount of input torque provided to the input shaft.

5. The method of claim 1, further comprising sending a signal to an engine control circuit to control the input torque.

6. The method of claim 1, further comprising repeating the comparing step until the countershaft acceleration is less than the threshold.

7. The method of claim 1, wherein the threshold is determined from an acceleration curve based on vehicle speed and vehicle acceleration.

8. The method of claim 1, further comprising:
   interpolating between at least two vehicle acceleration data points; and
   determining the threshold based on the result of the interpolating step.

9. The method of claim 1, further comprising sending a signal to an engine control circuit to increase the amount of input torque provided to the input shaft until the countershaft acceleration is within a percentage of the threshold.

10. A method of controlling input torque being transferred from an engine to a transmission of a powered vehicle, comprising:
    (a) transferring torque to an input of the transmission;
    (b) measuring a rotational speed of a countershaft in the transmission;

(c) computing an acceleration of the countershaft based on the measured rotational speed;
(d) determining a vehicle acceleration threshold based on vehicle speed;
(e) comparing countershaft acceleration to the threshold; and
(f) controlling input torque based on the result of the comparison.

11. The method of claim 10, wherein the controlling step comprises limiting the input torque.

12. The method of claim 11, wherein the limiting step comprises reducing the input torque until the countershaft acceleration is less than the threshold.

13. The method of claim 10, further comprising sending a signal to an engine control circuit to control the amount of input torque transferred to the transmission input.

14. The method of claim 10, wherein steps (b)-(e) are continuously repeated until the countershaft acceleration is less than the threshold.

15. The method of claim 10, wherein the threshold is determined from an acceleration curve based on vehicle speed and vehicle acceleration.

16. The method of claim 10, further comprising:
interpolating between at least two vehicle acceleration data points; and
determining the threshold based on the result of the interpolating step.

17. The method of claim 10, further comprising sending a signal to an engine control circuit to increase the amount of input torque provided to the input shaft until the countershaft acceleration is within a percentage of the threshold.

* * * * *